United States Patent Office 3,702,257
Patented Nov. 7, 1972

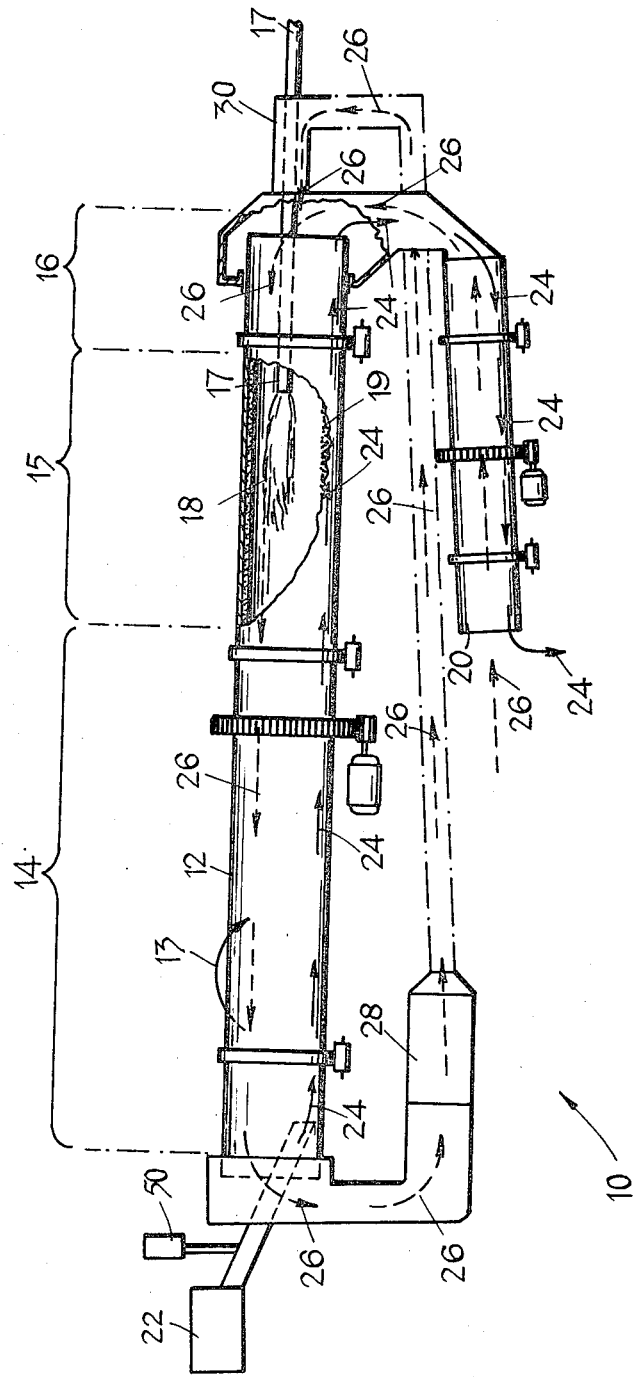

3,702,257
MANUFACTURE OF LIGHTWEIGHT AGGREGATE
Ely Koning, 21 Aletta Court, Celliers St., Sunnyside, Pretoria, Transvaal, Republic of South Africa
Continuation-in-part of application Ser. No. 726,601, May 3, 1968. This application Mar. 31, 1970, Ser. No. 24,086
Claims priority, application South Africa, Apr. 3, 1969, 69/2,389; May 30, 1969, 69/3,894
Int. Cl. C08h *17/06*
U.S. Cl. 106—288 B                    2 Claims

ABSTRACT OF THE DISCLOSURE

Lightweight aggregate is manufactured by pelletizing fly ash. A binder is used comprising an oil in water emulsion with emulsifying agent. Heavy fuel oil is preferred and molasses can be added. Emulsifying agent is a cationic amine with an acid. The outer surface of the pellets is preferably sprayed with fuel oil before subjecting to heat treatment. Alumina content is supplemented to at least 20%, silica content to at least 40%, carbon content to at least 5%, iron oxide content to at least 3%, to form mullite at elevated temperature. Heat treatment preferably includes an initial stage when carbon is burnt, a second stage when sintering occurs with formation of mullite and a third stage when stress relieving occurs.

CROSS REFERENCES TO RELATED APPLICATIONS

This application is a continuation-in-part of my copending patent application, Serial No. 726,601, filed May 3, 1968, for "Utilization of Fly Ash" and abandoned after filing this application.

BACKGROUND OF THE INVENTION

This invention relates to the manufacture of lightweight aggregate. It relates in particular to the manufacture of lightweight aggregate from fly ash.

Formation of pellets has been described, generally using water as a binder. Addition of bentonite (L. G. Tucker Jr. et al., 2,946,112), sewage sludge cake (A. C. Eichenlaub, 3,030,222) and organic binders (V. J. Duplin 2,948,948) has been described, for example. Use of fuel oil dispersed throughout the pellet has been shown by experiments to be objectionable, however (L. F. Gelbman, 2,544,752).

SUMMARY OF THE INVENTION

It is one object of this invention to provide a pelletized composition for sintering having a binder by which the pellets are resistant to disintegration.

Another object is to produce sintered pellets having high strength making them well suited for application in construction works.

A process for making a lightweight aggregate in accordance with this invention includes the steps of providing a raw material in finely divided form, the raw material containing sufficient silica and alumina to form mullite at elevated temperature, and combustible material, forming the raw material into pellets with a binder comprising an emulsion of a liquid carbonaceous fuel dispersed in water with a cationic amine emulsifying agent added, subjecting the pellets to heat treatment while rolling in a rotary kiln, including a first zone in which the temperature measures between 700° C. and 1000° C., a second zone in which the temperature measures between 1260° C. and 1335° C., the heat treatment sufficient to result in formation of mullite and burning of combustible material within the pellets.

Preferably, after forming the raw material into pellets and before heat treating them, the pellets are sprayed with additional liquid carbonaceous fuel capable of carburizing when heat treatment begins.

It is desireable that the process includes the step of dry mixing with the dry raw material before the binder is added, alumina if the percentage alumina by analysis present is less than 20, silica if the percentage of silica by analysis is less than 40, a source of carbon if the percentage carbon by analysis present is less than 5, and iron oxide if the percentage iron oxide by analysis is less than 3.

Preferably the binder comprises a heavy fuel oil and molasses in a proportion to the water of about 1 part to between 30 and 50 parts water, and a cationic amine with a suitable acid for emulsification.

In carrying out the process of this invention there is provided before heat treatment, a raw, pelletized composition comprising a raw material in finely divided form containing sufficient alumina and silica to form mullite at an elevated temperature, a combustible material, a binder constituted by heavy fuel oil emulsified in water by an emulsifying agent, an acid and molasses.

BRIEF DESCRIPTION OF THE DRAWINGS

The drawings show in partly diagrammatic elevation an apparatus for manufacture of lightweight aggregate according to a preferred embodiment of the process of this invention.

DESCRIPTION OF THE PREFERRED EMBODIMENTS

Suitable raw material can be in the form of clay or fly ash having the analysis set out below:

TABLE I

| Chemical formula | Fly-ash, percent | Clay, percent |
|---|---|---|
| $SiO_2$ | 41.3–57.6 | 65.6 |
| $Al_2O_3$ | 35.5–25.2 | 20.6 |
| $Fe_2O_3$ | 5.8–6.5 } 7.77{ | 13.7 |
| $TiO_2$ | 1.22–1.27 | |
| $P_2O_5$ | 1.5–0.18 | |
| CaO | 9.3–4.9 | 0.186 |
| MgO | 1.81–1.11 | 0.0295 |
| $K_2O$ | 0.43–1.07 | 0.005 |
| $Na_2O$ | 0.27–0.12 | 0.0005 |
| $SO_3$ | 2.62–1.98 | Trace |
| $SiO_2/Al_2O_3$ | 1.17–2.29 | 4.8 |

This analysis excludes the carbon content, which is frequently between 5 and 12%. The carbon content can be supplemented, for example, by coal dust, or any hydrocarbon, which can be tannin, potato starch, gelatine or sawdust. If there is not sufficient alumina present in the raw material, then the content can be brought up to the required value of at least 20% by the addition of aluminum oxide in powder form. A grade known as "SA 23" is suitable.

The liquid carbonaceous fuel additive to the water to form the binder can comprise mineral, vegetable, or synthetic oil, in particular heavy fuel oil, and preferably molasses, is added. The binder may in many cases provide additional carbon to supplement the carbon content when mixed in the pellets. The emulsifying agent can be a cationic amine. It can be a substance presently available under the name Duomeen T, which is an aliphatic diamine derived from tallow.

In a specific example, the binder can have the following composition:

TABLE II

| | |
|---|---|
| Water | 36 to 40 gallons. |
| Heavy fuel oil | ½ to 1½ gallons. |
| Hydrochloric acid (commercial) | ⅕ to ⅓ gallon. |
| Molasses | ½ to 1½ gallons. |
| Duomeen T | 5 to 10 lbs. |

This binder is mixed with the raw material mixture in the proportion of about ⅙ to ¹⁄₁₀ by weight of raw material.

Referring to the drawings, reference numeral 10 refers generally to a kiln installation comprising a downwardly sloping kiln 12 rotatably mounted in the direction of arrow 13, about its longitudinal axis. The heating of the kiln is arranged to be such that it has a preheating or initial heat treatment zone 14 at the upper end, then a shorter further heat treatment zone 15, and then a still shorter cooling zone 16 at the lower end. The proportional lengths of these zones can conveniently be of the following order: 6:2:1. It will be understood that variations are possible. The kiln may have a total length of 40 to 60 metres and a diameter of 3 to 4 metres.

The kiln is provided with a fuel supply element 17 providing a flame 18. The flame is arranged so that it does not come into contact with the pellets 19 being burnt in the bottom of the kiln.

The installation further comprises a cooler 20, also mounted to rotate about its longitudinal axis. Air is drawn along the cooler in the direction of arrows 26, into the lower end of the kiln 12, and thence out at the upper end of the kiln. This air is then recirculated by a fan or blower 28 and blown into the lower end of the kiln via the air pipe 30. The flow of air is indicated by arrows 26, and the flow of pellets by arrows 24. If desired, the fan or blower 28 can be an induced draught fan or blower. Furthermore, if desired, a dust separator can be interposed between the outlet of the kiln and the fan or blower 28.

In a preferred embodiment a fly ash having an analysis as set out in Table I is measured out to 2520 lb. This is pelletized with suitable pelletizing equipment, several examples being well-known in the art, and which is illustrated here schematically by 22, with addition of 36 gallons of binder emulsified with ingredients according to Table II. The pellets are then fed in at the upper end of the kiln 12 in the direction of arrow 24. Preferably, in order to limit erosion of the pellets in the kiln, they are sprayed with heavy fuel oil prior to entering the kiln so as to receive a coating on their outer surface. This can be done with apparatus schematically indicated at 50. The pellets then pass downwardly in the direction of arrows 24, at the bottom of the kiln while it rotates in the direction of arrow 13. In passing through the preheating or initial heat treatment zone 14, they are subjected to a temperature of 700 to 1000° C. In this zone the free or combined carbon is burnt. Burning takes place from the inside of the pellets outwardly. The burning of the carbon results in the formation of carbon dioxide with evalution of other gases which causes cavities or vesicles within the pellets. Also, the heavy fuel oil on the surface carburizes to form a porous crust which is abrasion resistant.

In the further heat treatment zone 15, the pellets are sintered and also preferably glazed. For this purpose, the sintering temperature in this zone falls within the range of 1260° C. to 1335° C., or to the melting point of the raw materials being used, in particular at the pellet surface, i.e. the temperature can conveniently be sufficient to ensure glazing of the pellets. This melting point will have to be determined for each grade of raw material used and can be in the region of about 1450° C.

Formation of mullite probably takes place in the region of 1265° C., and the glazing can close the pellet pores. Thereafter the pellets pass into the cooling zone 16 behind the flame, where the temperature is generally in the region of about 1000° C. or less. Thereafter the pellets pass in the direction of arrows 24 into the cooler 20 and thence out of the cooler at a temperature of about 350° C. Cooler 20 preheats the air passing to the kiln. The cooler 20 can be about half the length of the kiln 12 and can be about 2 to 3 metres in diameter. Stress relieving is achieved by the controlled slow cooling. Total time of heat treatment is about 1¾ hours, controlled by suitable rotation speed and slope of the kiln, as is well known in the art. This can be varied between 1 to 2½ hours according to varying compositions of raw material and heating characteristics.

A lightweight aggregate produced according to the above described preferred embodiment had the following properties set out in Table III below, with figures for "standard" aggregate, and concrete, (e.g. quarried granite stone), for comparison:

TABLE III

| | L.W.A.[1] | Standard |
|---|---|---|
| Specific gravity | 1.8 | 2.75 |
| Aggregate crushing strength (p.s.i.) | 52,000 | 40,000 |
| Concrete made of L.W.A., granite sand, cement and water: | | |
| Unit weight (lb./cu. ft.) | 120 | 150 |
| 28 day strength crushing (p.s.i.) | 9,350 | 9,000 |

[1] L.W.A. stands for lightweight aggregate.

NOTES:
(1) The "standard" aggregate is an average quality quarried granite stone.
(2) The L.W.A. concrete was made with the following mix: water, 42 gallons; cement, 960 lbs.; L.W.A., 1,130 lbs.; crusher sand, 910 lbs. = 1 cu. yd. compacted concrete. This gave a cement/water ratio of 2.25 and gave a slump of 3 inches.
(3) The "standard" concrete was a concrete using granite stone and crusher sand with a comparable proportion of cement.
(4) Some reduction of the unit weight of the L.W.A. concrete could be obtained by using crushed L.W.A. instead of some or all of the sand
(5) Water absorption of the L.W.A. was high compared to granite stone.
(6) The crushing strength was determined by the test procedure prescribed in South African Bureau of Standards standard specification for aggregates for concrete, SABS, 718-1962.

What I claim is:

1. A raw pelletized composition capable of being bloated into a light-weight mullite-containing aggregate, said composition comprising pellets prepared by pelletizing a finely divided raw material containing at least 20% alumina, at least 40% silica, at least 5% carbon, and at least 3% iron oxide wih a binder in an amount between ⅙ and ¹⁄₁₀ by weight of the raw material, said binder comprising an acidic emulsion of one part heavy fuel oil and molasses dispersed in 30–50 parts water with an aliphatic diamine derived from tallow as an emulsifying agent.

2. A composition according to claim 1, wherein said binder comprises 34 parts water, ½ to 1 part heavy fuel oil, ¼ to ¾ parts molasses, ½ to 1 and ½ parts aliphatic diamine derived from tallow as an emulsifying agent, and ⅛ to ½ parts acid by volume.

References Cited

UNITED STATES PATENTS

| | | | |
|---|---|---|---|
| 3,536,503 | 10/1970 | Heidrich | 106—288 B |
| 2,544,752 | 3/1951 | Gelbman | 106—41 |
| 2,933,796 | 4/1960 | Somogyi | 106—DIG. 1 |
| 2,948,948 | 8/1960 | Duplin et al. | 106—DIG. 1 |
| 2,987,411 | 6/1061 | Minnick | 106—288 B |
| 3,030,222 | 4/1962 | Eichenlaub | 106—288 B |
| 3,328,180 | 6/1967 | Ban | 106—41 |
| 3,341,134 | 9/1967 | Corson et al. | 106—288 B |

JAMES E. POER, Primary Examiner

U.S. Cl. X.R.

106—41, 67, 309